(12) United States Patent
Katsiotis et al.

(10) Patent No.: US 11,731,113 B2
(45) Date of Patent: Aug. 22, 2023

(54) HIGH-YIELD SYNTHESIS OF NANOZEOLITE Y CRYSTALS OF CONTROLLABLE PARTICLE SIZE AT LOW TEMPERATURE

(71) Applicant: Khalifa University of Science and Technology, Abu Dhabi (AE)

(72) Inventors: Marios S. Katsiotis, Abu Dhabi (AE); Vasileios Tzitzios, Abu Dhabi (AE); Saeed Alhassan, Abu Dhabi (AE)

(73) Assignee: Khalifa University of Science and Technoloqy, Abu Dhabi (AE)

( * ) Notice: Subject to any disclaimer, the term of this patent is extended or adjusted under 35 U.S.C. 154(b) by 497 days.

(21) Appl. No.: 16/964,380

(22) PCT Filed: Aug. 23, 2017

(86) PCT No.: PCT/IB2017/000998
§ 371 (c)(1),
(2) Date: Jul. 23, 2020

(87) PCT Pub. No.: WO2019/038571
PCT Pub. Date: Feb. 28, 2019

(65) Prior Publication Data
US 2021/0046463 A1    Feb. 18, 2021

(51) Int. Cl.
*B01J 29/08* (2006.01)
*C01B 39/24* (2006.01)
(Continued)

(52) U.S. Cl.
CPC ......... *B01J 29/084* (2013.01); *B01J 35/0013* (2013.01); *B01J 35/1019* (2013.01);
(Continued)

(58) Field of Classification Search
CPC .............................. B01J 29/084; C01B 39/24
See application file for complete search history.

(56) References Cited

U.S. PATENT DOCUMENTS 6,793,911 B2 * 9/2004 Koegler .................. C01B 39/04
423/716
7,585,490 B2   9/2009 Larsen et al.
(Continued)

FOREIGN PATENT DOCUMENTS

WO      02/42208 A1    5/2002
WO    2004/000730 A2   12/2003
(Continued)

OTHER PUBLICATIONS

Lawton S. L., et al., "Synthesis and Proposed Framework Topology of Zeolite SUZ-4", Journal of the Chemical Society, Chemical Communications, Royal Society of Chemistry, GB, Jan. 1, 1993 (Jan. 1, 1993), pp. 894-896.
(Continued)

*Primary Examiner* — Ellen M McAvoy
*Assistant Examiner* — Ming Cheung Po
(74) *Attorney, Agent, or Firm* — Renner, Otto, Boisselle & Sklar, LLP

(57) ABSTRACT

The present application relates to a method for synthesizing nanozeolite Y crystals, nanozeolite Y crystals obtainable by said method, and the use of the synthesized nanozeolite Y crystals in cracking hydrocarbons, as molecular sieves or as ion-exchangers.

17 Claims, 7 Drawing Sheets

Figure 1:
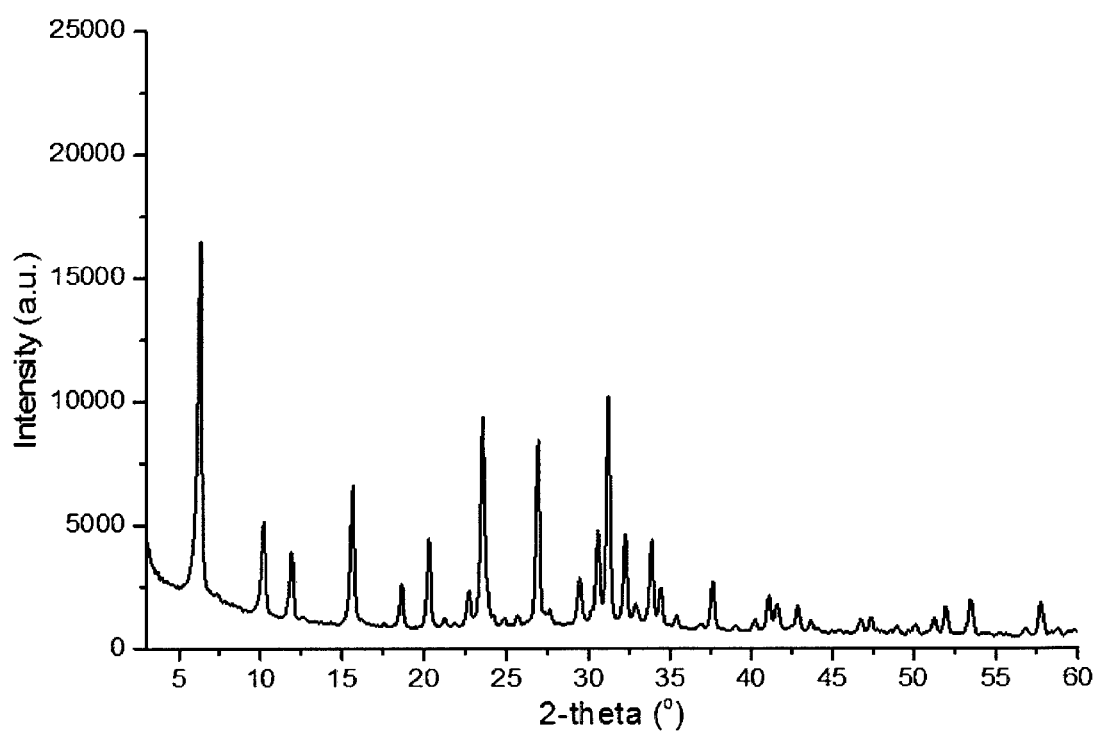

(51) Int. Cl.

| | |
|---|---|
| *B01J 35/00* | (2006.01) |
| *B01J 35/10* | (2006.01) |
| *B01J 37/00* | (2006.01) |
| *B01J 37/02* | (2006.01) |
| *B01J 37/03* | (2006.01) |
| *B01J 37/04* | (2006.01) |
| *B01J 37/06* | (2006.01) |
| *B01J 37/08* | (2006.01) |
| *B01J 37/30* | (2006.01) |
| *C01B 39/20* | (2006.01) |
| *C10G 11/05* | (2006.01) |

(52) U.S. Cl.
CPC ....... *B01J 35/1023* (2013.01); *B01J 35/1057* (2013.01); *B01J 35/1061* (2013.01); *B01J 37/0018* (2013.01); *B01J 37/0236* (2013.01); *B01J 37/031* (2013.01); *B01J 37/04* (2013.01); *B01J 37/06* (2013.01); *B01J 37/08* (2013.01); *B01J 37/30* (2013.01); *C01B 39/205* (2013.01); *C01B 39/24* (2013.01); *C10G 11/05* (2013.01); *B01J 2229/186* (2013.01); *C01P 2002/60* (2013.01); *C01P 2002/72* (2013.01); *C01P 2002/80* (2013.01); *C01P 2004/03* (2013.01); *C01P 2006/12* (2013.01); *C01P 2006/16* (2013.01)

(56) References Cited

U.S. PATENT DOCUMENTS 9,156,706 B2 * 10/2015 Davis .................... C01B 39/48
2016/0031715 A1   2/2016 Hedlund et al.

FOREIGN PATENT DOCUMENTS

| WO | 2008/058398 A1 | 5/2008 | |
|---|---|---|---|
| WO | 2015/101800 A1 | 7/2015 | |
| WO | WO-2015101800 A1 * | 7/2015 | ............ B01J 29/084 |

OTHER PUBLICATIONS

Supplementary European Search Report for corresponding EP Application No. 17922107.2, dated Mar. 11, 2021.

International Search Report and Written Opinion for corresponding International Patent Application No. PCT/IB2017/000998.

Chaves, Thiago F. et al, "A simple synthesis procedure to prepare nanosized faujasite crystals," Microporous and Mesoporous Materials, 2012, 161, 67-75. doi:10:1016/j.micromeso.2012.05.022 Introduction, Experimental.

Intellectual Property Office India, Examination Report issued for corresponding India Application No. 202047011878, dated Dec. 2, 2020.

* cited by examiner

HIGH-YIELD SYNTHESIS OF NANOZEOLITE Y CRYSTALS OF CONTROLLABLE PARTICLE SIZE AT LOW TEMPERATURE

1. FIELD OF THE INVENTION

The present invention relates to the petrochemical field of catalytically cracking hydrocarbons. The invention is directed to the high-yield synthesis of nanozeolite Y crystals of controllable crystal size at low temperature. The accordingly synthesized nanozeolite Y crystals can be used in particular as catalysts in the thermal decomposition of hydrocarbons, as well as molecular sieves and/or ion-exchangers.

2. PRIOR ART

During industrial catalytic cracking of hydrocarbons, high conversion of oil-derived hydrocarbons results in the formation of bulky organic compounds that cannot be desorbed from the zeolite catalyst under the operating conditions. Such organic compounds can act as precursors of coke, and such process is generally referred to as coking.

Coking leads to the progressive decay of catalyst activity and selectivity by plugging the catalyst's pores, which eventually results in complete deactivation. Therefore, the catalyst needs to be constantly removed from the reactor and regenerated by burning-off the coke. However, coke that is trapped within the microporous catalyst structure cannot be removed efficiently, and thereby decreases the overall catalyst lifetime and efficiency.

In order to minimize such coking processes, among different strategies with regard to the catalyst structure the use of nanosized zeolites (so called "nanozeolites") is a promising approach.

Nanozeolites are zeolites with crystal diameters below 1 μm and with a high ratio of outer to inner surface. Compared to conventional micrometer-sized zeolites, nanozeolites offer several advantages: Due to the larger external surface area and the higher fraction of acidic functionalities at the surface, long-chain hydrocarbons that do not enter the pores of the zeolite can be efficiently processed. Further, the short channels reduce the diffusional resistance for the reaction of incoming and outgoing species at active sites. In general, the increase of easy-accessible active sites that are closer to the surface leads to a higher catalyst activity and less de-activation.

Among the zeolites and nanosized zeolites used for catalytic cracking, the type Y zeolite (faujasite, FAU) is the most commonly used zeolite due to its high catalytic activity and stability at high temperatures.

The synthesis of nanozeolite Y has been described in the literature. Main challenges in synthesizing nanozeolite Y derive primarily from the need to limit the particle diameter to below 1 μm while achieving a certain degree of particle shape uniformity.

Important parameters in the synthesis routine include control over the mixing procedure, pH, and temperature over a long time period (typically more than 3 days).

Often, structure directing agents (SDAs) are used to prepare nanozeolites Y (e.g. Taufiqurrahmi et al., Materials Science and Engineering, Vol. 17, No. 1, 2011). Well-known SDAs include tetramethylammonium hydroxide, tetrapropylammonium hydroxide, tetraalkylammonium hydroxide, tetraethylorthosilicate, and tetramethylammonium bromide. Syntheses of Y nanozeolite structures using solutions of the above-mentioned SDAs and their derived cations are reported at temperatures ranging between room conditions (22° C.) to 160° C. and typically result in rather uniformly shaped and sized nanoparticles. The yield of these syntheses is, however, often very low (below 20%).

Such low yield is the trade-off in the synthesis of zeolites of diameters below 1 μm. The size-control of nanozeolites is usually achieved by keeping a relatively low temperature, thus slowing down nucleation and crystal growth (e.g. U.S. Pat. No. 7,585,490 B2).

Another reported SDA is quinuclidine, which has been-used in the synthesis of zeolites. Particularly, U.S. Pat. No. 9,156,706 discloses quinuclidine as an SDA for the synthesis of Levynite (LEV)-type zeolites from FAU-type zeolites. However, the synthesis of nanozeolite Y (FAU) using quinuclidine as an SDA has not been demonstrated.

US 20160031715 mentions substituted azoniabicyclooctanes, e.g. methyl- or ethyl-substituted quinuclidine, as SDA for the preparation of FAU-type zeolites. The described synthesis routine includes fluorine-containing compounds as mineralizing agent to reduce the number of defects in the crystal structure.

The synthesis of Y nanozeolites without the use of SDAs is also reported, usually originating from gel systems (e.g. Valtchev et al., Langmuir, 2005, 21). In most cases, this requires the use of pure chemicals and optimized conditions to ensure the formation of nanosized particles. Typically, when SDA-free synthetic procedures are used, the processes are of high complexity and the particles are neither uniform nor below 1 μm in diameter.

Overall, different challenges are associated with the synthesis of nanozeolite Y. Specifically, using SDAs typically results in low yield of nanozeolite products, while using gel systems typically requires the application of complicated synthetic procedures and usually results in products with broad size distribution and/or variable shape.

3. BRIEF DESCRIPTION OF THE INVENTION

The present invention addresses the above-mentioned disadvantages concerning the efficient synthesis of uniformly sized and shaped nanozeolite Y crystals.

In a preferred embodiment, nanozeolite Y crystals are synthesized in a method comprising the following steps:
a) Preparing a first aqueous solution comprising a silicate source and quinuclidine;
b) Preparing a second aqueous solution comprising an aluminate source and an alkali hydroxide;
c) Combining the first and the second aqueous solution to obtain an aqueous reaction mixture;
d) Incubating the aqueous reaction mixture to obtain nanozeolite Y crystals;
e) Washing the obtained nanozeolite Y crystals with an aqueous washing buffer;
f) Drying the washed nanozeolite Y crystals to remove residual crystalline water; and
g) Calcining the washed nanozeolite Y crystals.

The inventors have developed this method to achieve a highly efficient process for synthesizing nanozeolite Y crystals. The yield of nanozeolite Y amounts to at least 95% relative to the theoretically expected mass yield of zeolites.

Drying the crystals before calcining is performed in order to facilitate the ion exchange process by completely removing bound water. The crystals may be dried for example at temperatures below 150° C., or between 25° C. and 120° C., or between 50° C. and 100° C. for time periods of at least 2 h, or between 2 h and 5 h, or between 4 h and 10 h.

Alternatively or in combination, freeze-drying and vacuum-drying may also be performed.

In another preferred embodiment, the alkali hydroxide is sodium hydroxide and the method comprises the additional steps:

h) Mixing the calcined nanozeolite Y crystals with a third aqueous solution comprising ammonium ions to exchange the sodium ions of the calcined nanozeolite Y crystals against ammonium ions;
i) Washing the ammonium containing nanozeolite Y crystals with an aqueous washing buffer;
j) Drying the washed nanozeolite Y crystals to remove residual crystalline water; and
k) Calcining the washed nanozeolite Y crystals.

Washing the obtained nanozeolite Y crystals with an ammonium containing solution, e.g. ammonium chloride, results in the exchange of sodium ions in the crystal structure with ammonium ions. The subsequent calcination process leads to the decomposition of ammonium groups so that $H^+$ cations exist on the framework, thus giving rise to Brønsted acidity.

In another preferred embodiment, steps h) to k) are repeated to reduce the amount of $Na^+$ ions in the calcined nanozeolite Y crystals to
a) less than 5% $Na^+$ ions,
b) less than 3% $Na^+$ ions, or
c) less than 1% $Na^+$ ions.

In another preferred embodiment, quinuclidine is contained in a fraction of
a) between 0.0125 and 0.24 mol %,
b) between 0.05 and 0.18 mol %, or
c) between 0.09 and 0.11 mol %.

The inventors have found that quinuclidine ($C_7H_{13}N$) acts as an SDA, a crystal nucleation promoter, and a pH adjuster in the crystallization reaction. Therefore, it promotes the crystallization of nanozeolite Y and simultaneously stabilizes the pH value of the crystallization solution. Zeolites are known to crystallize only in a limited pH range of pH 13+/−1, which is in the regime of the buffer capacity of quinuclidine ($pK_a$=12.1).

In a preferred embodiment, the silicate source ($[SiO_4]^{4-}$) is contained in the aqueous reaction mixture in a fraction of
a) between 0.8 and 4.9 mol %,
b) between 1.0 and 3.0 mol %, or
c) between 1.2 and 2.0 mol %.

In another preferred embodiment, the aluminate source ($[Al(OH)_4]^-$) is contained in the aqueous reaction mixture in a fraction of
a) between 0.48 and 1.06 mol %,
b) between 0.60 and 1.0 mol %, or
c) between 0.72 and 0.92 mol %.

The respective ratio ranges of the silicate source to the aluminate source in the aqueous reaction mixtures allow efficient crystallization into FAU type zeolites, while avoiding the generation of other types of zeolite crystals.

In another preferred embodiment, the sodium hydroxide is contained in the aqueous reaction mixture in a fraction of
a) between 1.0 and 8.5 mol %,
b) between 2.5 and 6.5 mol %, or
c) between 4.5 and 5.5 mol %.

The amounts of the different components in the aqueous reaction mixture can also be described based on the mole to mole ratios.

In another preferred embodiment, the mole to mole ratios in the aqueous reaction mixture are: Quinuclidine in a mole to mole ratio of 0.05 to 0.48, preferably of 0.1 to 0.4, more preferably of 0.2 to 0.3, most preferably the mole to mole ratio is about 0.23; The silicate source is in the form of silica ($SiO_2$) being in a mole to mole ratio of 3.25 to 9.80, preferably 3.4 to 6.0, more preferably 3.6 to 5.0, most preferably the mole to mole ratio is about 3.84; The aluminate source is in the form of alumina ($Al_2O_3$) being in a mole to mole ratio of 0.95 to 1.05, preferably of 0.97 to 1.03, more preferably of 0.2 to 0.3, most preferably the mole to mole ratio is about 1.00; The alkali hydroxide is sodium hydroxide in the form of sodium oxide ($Na_2O$) being in a mole to mole ratio of 4.52 to 7.98, preferably of 5.0 to 7.0, more preferably of 5.5 to 6.5, most preferably the mole to mole ratio is about 6.14; The aqueous solution comprises deionized water ($H_2O$) in a mole to mole ratio of 200 to 400, preferably of 210 to 350, more preferably of 220 to 300, most preferably the mole to mole ratio is about 232.99.

In another preferred embodiment, the first aqueous solution has a pH value of
a) between 1 and 14,
b) between 11.5 and 13.5, or
c) between 12 and 13.

In another preferred embodiment, the second aqueous solution has a pH value of
a) between 11 and 14,
b) between 12.5 and 13.8, or
c) between 13.2 and 13.6.

In another preferred embodiment, the aqueous reaction mixture has a pH value of
a) between 11 and 14,
b) between 11.5 and 13, or
c) between 12 and 12.5.

Stabilizing the pH value of the crystallization solution to 12 to 12.5 promotes the controlled growth rate of the nanozeolite Y crystals.

In another preferred embodiment, the aqueous washing buffer has a conductivity
a) smaller than 500 µS/cm,
b) smaller than 50 µS/cm, or
c) smaller than 15 µS/cm,
and the aqueous washing buffer has a pH of
a) between 5.5 and 8.5,
b) between 6 and 8, or
c) between 6.5 and 7.5.

In another preferred embodiment, in the third aqueous solution the ammonium source is contained in a concentration of
a) between 0.001 and 0.3 M,
b) between 0.05 and 0.25 M, or
c) between 0.1 and 0.2 M.

In another preferred embodiment, after combining the first and the second aqueous solution the aqueous reaction mixture is stirred for a time period of
a) at least 1 h,
b) at least 10 h,
c) at least 25 h, or
d) at least 40 h.

By increasing the stirring time of the aqueous solution mixture to at least 1 h, the silicate source and the aluminate source are completely dissolved, which is important in order to grant homogeneous growth of the nanozeolite Y crystals.

In another preferred embodiment, after combining, or after combining the first and the second solution and stirring the aqueous reaction mixture, the aqueous reaction mixture is incubated at a temperature of
a) below 150° C. for a minimum time period of 5 h,
b) between 20° C. and 75° C. for a time period between 60 h and 300 h, or c) between 75° C. and 100° C. for a time period between 20 h and 60 h.

The inventors have found that the higher the temperature during crystallization is set, the faster the crystals nucleate and grow and the less crystallization time is needed to obtain nanozeolite Y crystals of the favorite crystal diameter.

In another preferred embodiment, washing steps e) and/or i) is/are repeated, until the decanted washing buffer has a pH value of
a) between 5.5 and 8.5,
b) between 6 and 8, or
c) between 6.5 and 7.5.

In another preferred embodiment, the nanozeolite Y crystals are calcined at a temperature of
a) below 750° C. for a minimum time period of 2 h,
b) between 65° C. and 750° C. for a time period between 2 and 15 h, or
c) between 550° C. and 650° for a time period between 4 and 8 h.

The decomposition temperature of FAU type zeolites is 793° C. Therefore, calcining is performed at temperatures below. The calcination step increases the silicon-to-aluminium ratio in the final nanozeolite Y crystals, rendering such crystals more temperature-stable.

In another preferred embodiment, quinuclidine is used in the aqueous reaction mixture
a) in a fraction of 0.04 to 0.09 mol % to obtain nanozeolite Y crystals of a diameter between 100-700 nm,
b) in a fraction of 0.12 to 0.17 mol % to obtain nanozeolite Y crystals of a diameter between 50-300 nm, or
c) in a fraction of 0.10 to 0.14 mol % to obtain nanozeolite Y crystals of a diameter between 30-200 nm.

The inventors have found that by varying the concentration of the nucleation-promoting SDA quinuclidine the average diameter of the obtained nanozeolite Y crystals can be easily fine-tuned to the desired size. By increasing the fraction of quinuclidine to 0.14 mol %, crystals of a diameter of 120+/−30 nm can be obtained.

In another preferred embodiment, nanozeolite Y crystals are obtained by the method of any of the above mentioned preferred embodiments.

The disclosed method can be used in particular for the synthesis of (FAU-type) nanozeolite Y crystals at high yield.

In another preferred embodiment,
a) 90% of the synthesized nanozeolite Y crystals have a diameter of
  i) between 100 and 700 nm,
  ii) between 50 and 800 nm, or
  iii) between 200 and 400 nm,
b) and/or 90% of the synthesized nanozeolite Y crystals have a specific surface area of
  i) between 500 and 840 m$^2$/g,
  ii) between 450 and 680 m$^2$/g, or
  iii) between 650 and 720 m$^2$/g,
c) and/or 90% of the synthesized nanozeolite Y crystals have a pore diameter of
  i) between 10 and 14 Å,
  ii) between 15 and 22 Å, or
  iii) between 14 and 35 Å,
d) and/or 90% of the synthesized nanozeolite Y crystals have a silicon to aluminum ratio of
  i) at least 3.8,
  ii) at least 7.0, or
  iii) at least 8.9,
e) and/or the synthesized nanozeolite Y crystals do not contain fluoride ions.

In another preferred embodiment, the nanozeolite Y crystals obtainable by any of the above mentioned preferred embodiments are used as catalysts in the catalytic cracking of hydrocarbons, and/or as molecular sieves and/or as ion-exchangers.

In yet another preferred embodiment, hydrocarbons are cracked by using the nanozeolite Y crystals.

4. BRIEF DESCRIPTION OF THE DRAWINGS

Possible embodiments of the present invention are further described in the following detailed description, with reference to the following figures:

FIG. 1 X-Ray Diffractogram of synthesized Nanozeolite Y crystals of worked example 1

Figure 2:
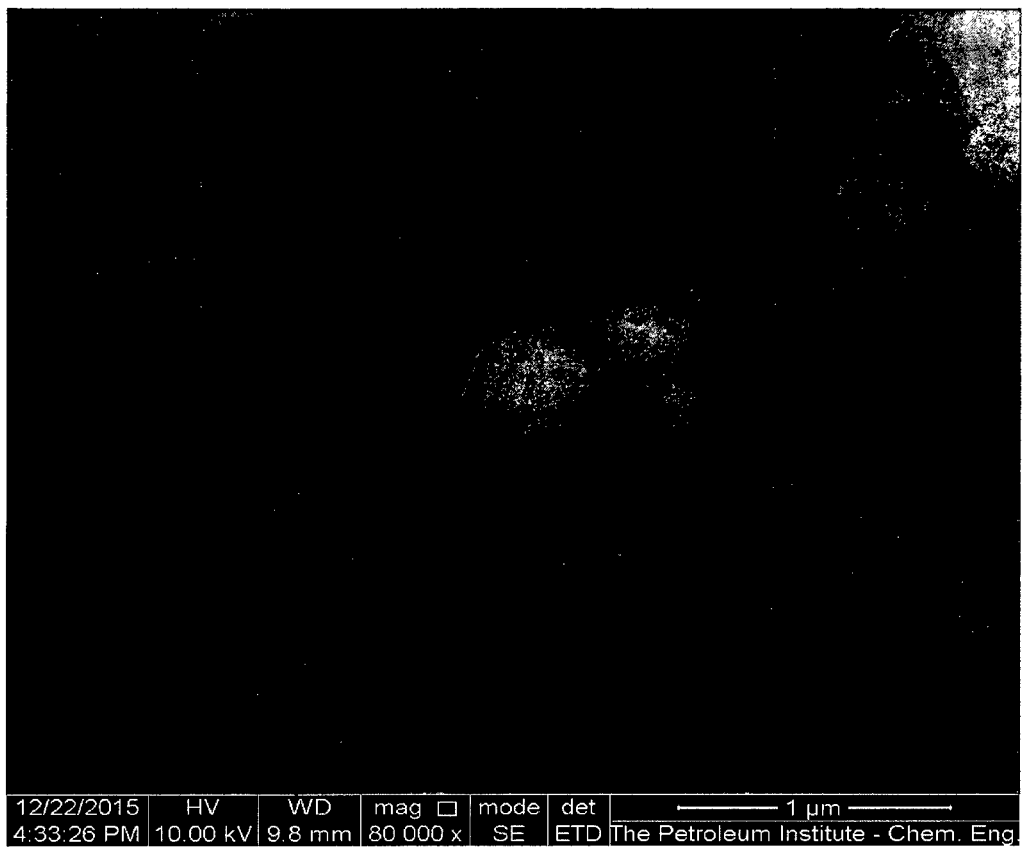

FIG. 2 Scanning Electron Microscopy image of synthesized Nanozeolite Y crystals of worked example 1

Figure 3:
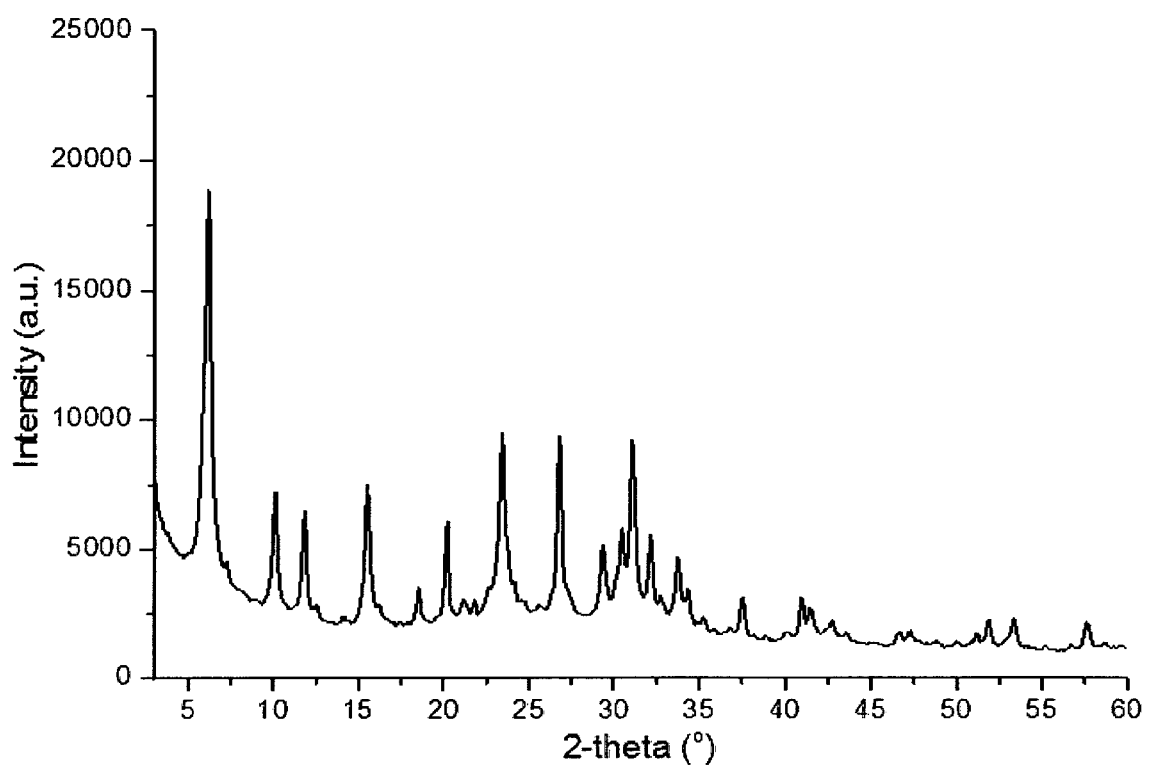

FIG. 3 X-Ray Diffractogram of synthesized Nanozeolite Y crystals of worked example 2

Figure 4:
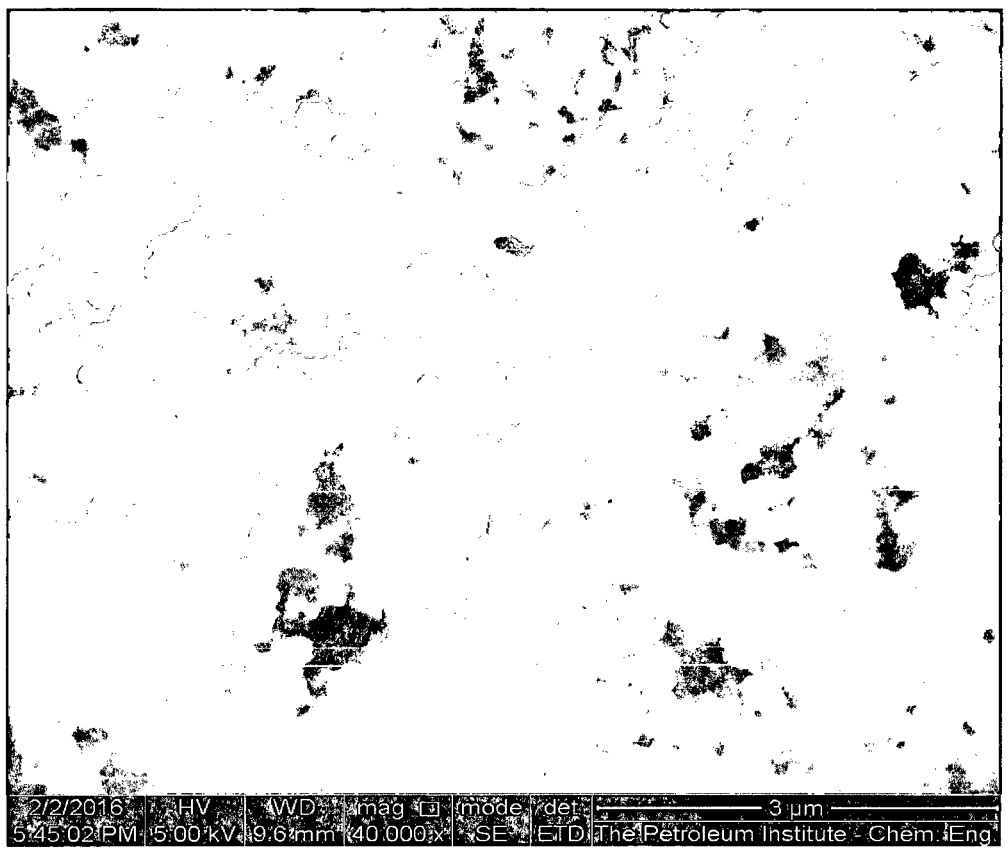

FIG. 4 Scanning Electron Microscopy image of synthesized Nanozeolite Y crystals of worked example 2

Figure 5:
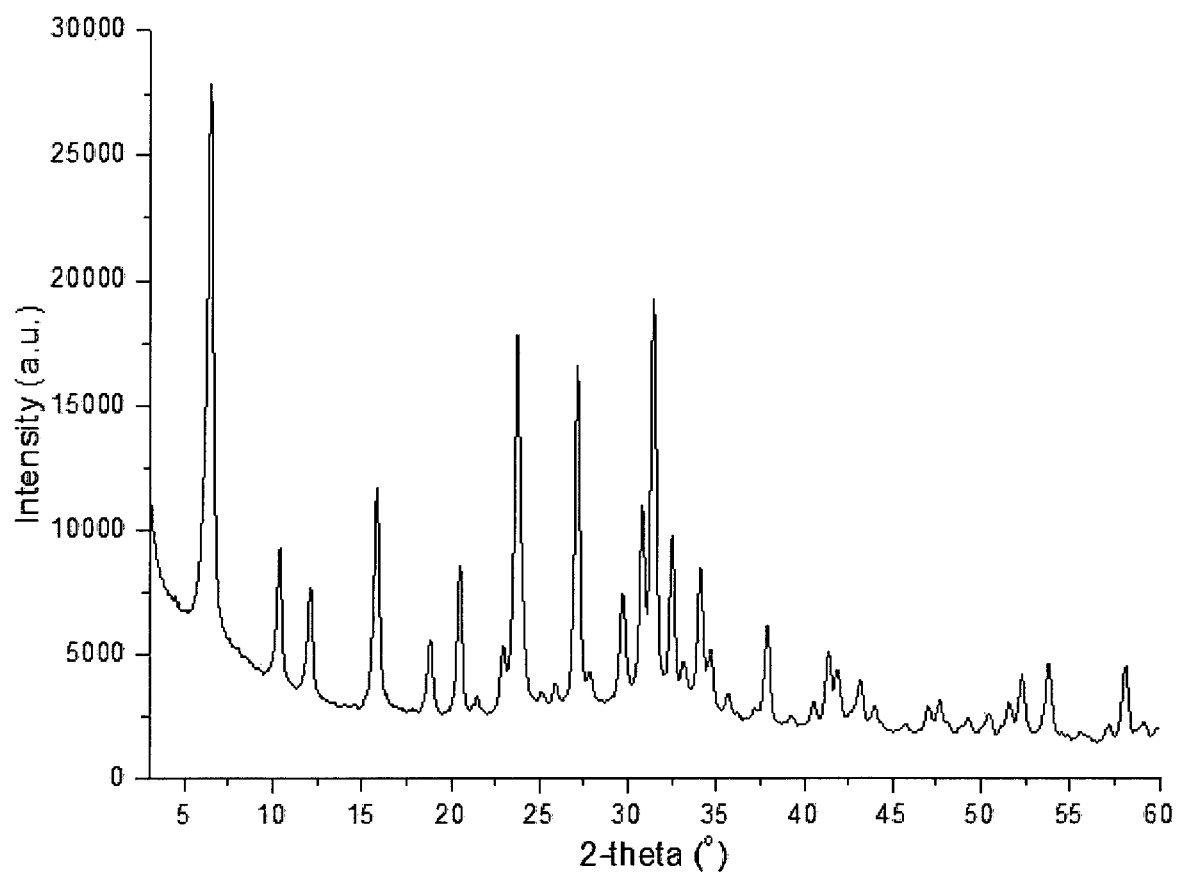

FIG. 5 X-Ray Diffractogram of synthesized Nanozeolite Y crystals of worked example 3

Figure 6:
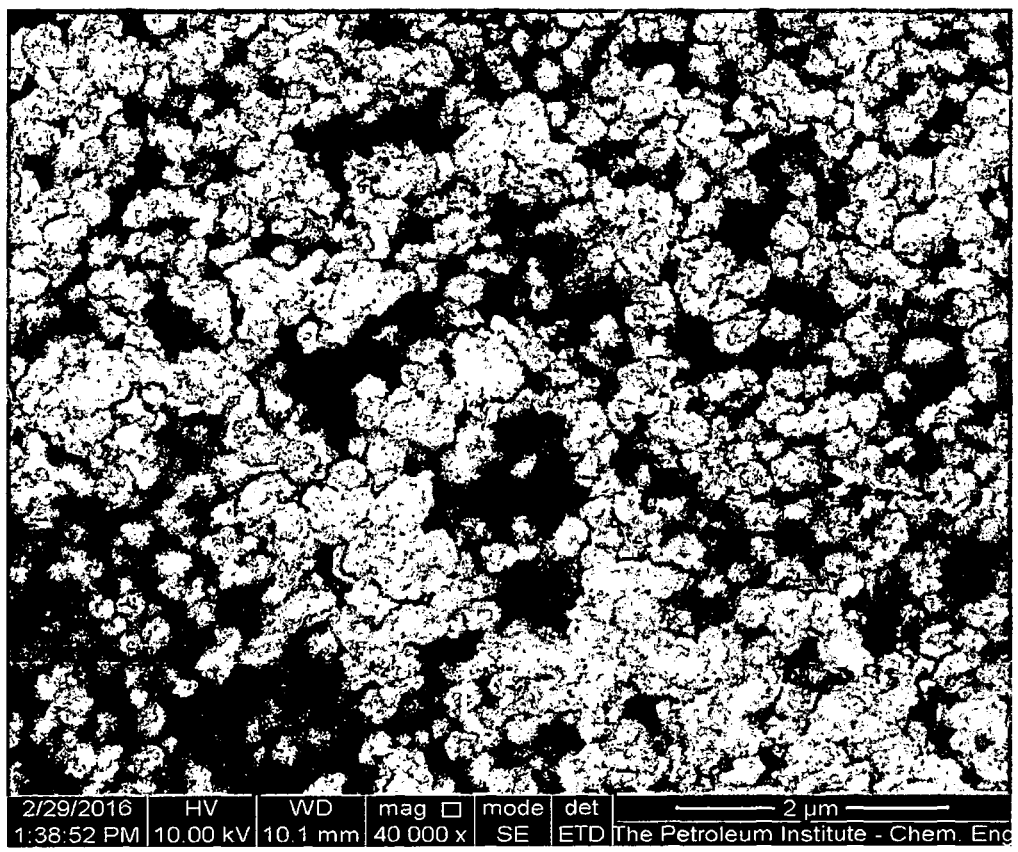

FIG. 6 Scanning Electron Microscopy image of synthesized Nanozeolite Y crystals of worked example 3

Figure 7:
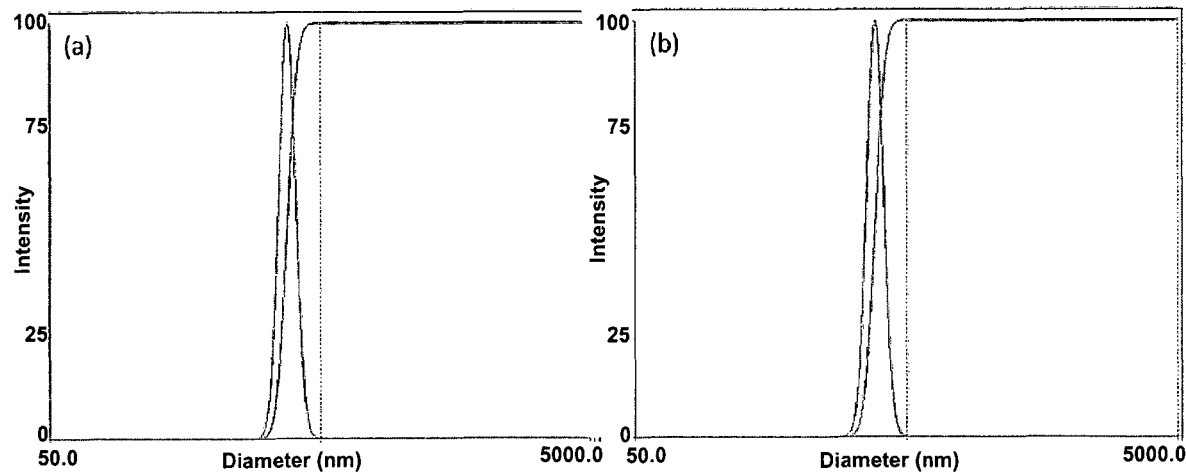

FIG. 7 DLS measurements from Na—Y (a) and H—Y (b) zeolites

Figure 8:
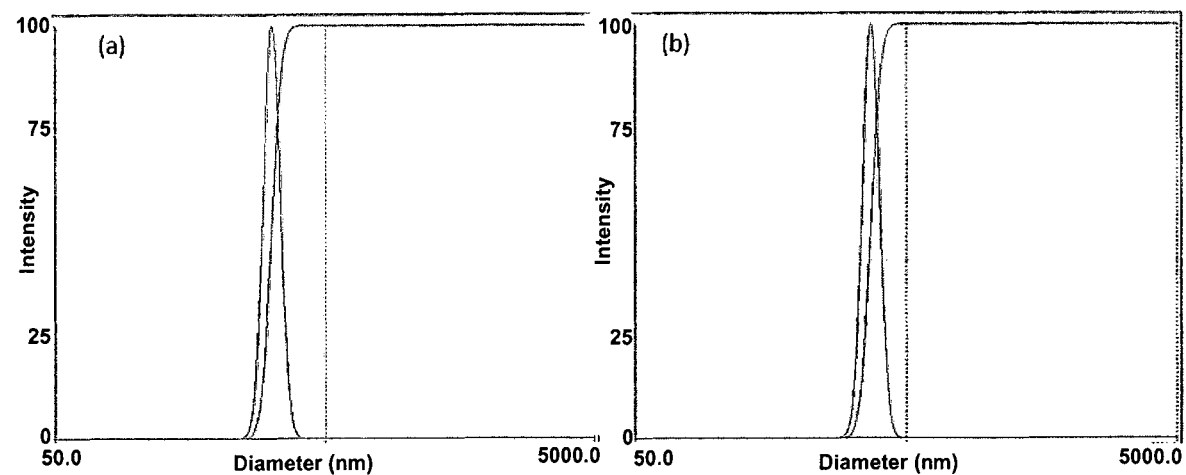

FIG. 8 DLS measurements from Na—Y (a) and H—Y (b) zeolites

5. DETAILED DESCRIPTION OF THE INVENTION

Hereafter, worked examples of the present invention are described in detail.

Example 1

A first aqueous solution was prepared by dissolving quinuclidine powder under strong mixing in de-ionized water, then adding colloidal silica to the solution, followed by mixing for 30 minutes. A second aqueous solution was prepared by dissolving sodium hydroxide in de-ionized water, then adding sodium aluminate to the solution, followed by mixing for 30 minutes.

An aqueous reaction mixture was obtained by dropwise adding the first aqueous solution to the second aqueous solution, with the final mole to mole ratios: 0.11 quinuclidine, 3.84 $SiO_2$, 1.00 $Al_2O_3$, 6.14 $Na_2O$, 232.99 $H_2O$.

The aqueous reaction mixture was stirred at room temperature for 48 h, then incubated at 64° C. for 72 h to allow crystallization. The obtained crystals were collected by centrifugation and washed repeatedly until the decanted washing buffer exhibited a pH of 7.1. The crystals were dried at 80° C. for 5 h, and subsequently calcined at 550° C. for 10 h in air to remove any organic residue.

Following the calcined nanozeolite Y crystals were ion-exchanged three times using a solution of ammonium chloride (0.1M) according to the subsequent procedure: mixing the calcined nanozeolite crystals with the ammonium chloride solution, washing of the crystals with pH neutral double distilled water, drying of washed crystals for 5 h at 80° C., calcinating for 10 h at 550° C. in air to remove any organic residue. This procedure was repeated three times such that more than 99% of the $Na^+$ cations of the crystals were replaced with $H^+$ cations, as determined by Inductively Coupled Plasma (ICP) analysis.

The calcined crystals had a diameter ranging between 80 and 700 nm, a specific surface area of 650+/−65 m²/g and a Si:Al ratio of 3.84.

A X-ray diffractometer was used to determine the framework type of the synthesized zeolites (CuKα radiation). The 2-theta angle was varied between 0° and 60°. Table 1, listing the peak positions versus the 2-theta angle, and FIG. 1 confirms that FAU type zeolites were synthesized.

FIG. 2 shows a Scanning Electron Microscopy image of synthesized Nanozeolite Y as obtained in this example.

TABLE 1

| 2-theta position ± 0.25 (°) | Relative Intensity |
|---|---|
| 6.3 | 100 |
| 10.2 | 29 |
| 11.8 | 21 |
| 15.6 | 39 |
| 18.6 | 13 |
| 20.3 | 25 |
| 23.6 | 55 |
| 26.9 | 49 |
| 29.4 | 15 |
| 30.5 | 27 |
| 31.2 | 61 |
| 33.8 | 24 |
| 34.5 | 13 |
| 37.6 | 14 |
| 41.1 | 10 |
| 41.6 | 8 |

Example 2

A first aqueous solution was prepared by dissolving quinuclidine powder under strong mixing in de-ionized water, then adding colloidal silica to the solution, followed by mixing for 30 minutes. A second aqueous solution was prepared by dissolving sodium hydroxide in de-ionized water, then adding sodium aluminate to the solution, followed by mixing for 30 minutes.

An aqueous reaction mixture was obtained by dropwise adding the first aqueous solution to the second aqueous solution, with the final mole to mole ratios: 0.23 quinuclidine, 3.84 $SiO_2$, 1.00 $Al_2O_3$, 6.14 $Na_2O$, 232.99 $H_2O$.

The aqueous reaction mixture was stirred at room temperature for 48 h, then incubated at 64° C. for 72 h to allow crystallization. The obtained crystals were collected by centrifugation and washed repeatedly until the decanted washing buffer exhibited a pH of 7.1. The crystals were dried at 80° C. for 5 h, and subsequently calcined at 550° C. for 10 h in air to remove any organic residue.

Following the calcined nanozeolite Y crystals were ion-exchanged three times using a solution of ammonium chloride (0.1M) following the procedure described above for example 1.

The calcined crystals had a diameter ranging between 50 and 450 nm, a specific surface area of 720+/−90 m2/g and a Si:Al ratio of 3.84.

An X-Ray Diffractogram was acquired as described in Example 1. Table 2, listing the peak positions versus the 2-theta angle, and FIG. 3 confirms that FAU type zeolites were synthesized.

FIG. 4 shows a Scanning Electron Microscopy image of synthesized Nanozeolite Y as obtained in this example.

TABLE 2

| 2-theta position ± 0.25 (°) | Relative Intensity |
|---|---|
| 6.2 | 100 |
| 10.0 | 35 |
| 11.8 | 31 |
| 15.5 | 37 |
| 18.5 | 15 |
| 20.2 | 29 |
| 23.4 | 48 |
| 26.7 | 47 |
| 29.3 | 24 |
| 30.5 | 27 |
| 31.1 | 47 |
| 33.7 | 26 |
| 34.3 | 15 |
| 37.5 | 13 |
| 40.9 | 13 |
| 41.5 | 11 |
| 53.3 | 9 |

Example 3

A first aqueous solution was prepared by dissolving quinuclidine powder under strong mixing in de-ionized water, then adding colloidal silica to the solution, followed by mixing for 30 minutes. A second aqueous solution was prepared by dissolving sodium hydroxide in de-ionized water, then adding sodium aluminate to the solution, followed by mixing for 30 minutes.

An aqueous reaction mixture was obtained by dropwise adding the first aqueous solution to the second aqueous solution, with the final mole to mole ratios: 0.42 quinuclidine, 7.75 $SiO_2$, 1.00 $Al_2O_3$, 6.14 $Na_2O$, 252.55 $H_2O$.

The aqueous reaction mixture was stirred at room temperature for 96 h, then incubated at 80° C. for 24 h to allow crystallization. The obtained crystals were collected by centrifugation and washed repeatedly until the decanted washing buffer exhibited a pH of 7.1. The crystals were dried at 80° C. for 5 h, and subsequently calcined at 550° C. for 10 h in air to remove any organic residue.

Following, the calcined nanozeolite Y crystals were ion-exchanged three times using a solution of ammonium chloride (0.1M) following the procedure described above for example 1.

The calcined crystals had a diameter ranging between 40 and 200 nm, a specific surface area of 740+/−80 m²/g and a Si:Al ratio of 7.75.

An X-Ray Diffractogram was acquired as described in Example 1. Table 3, listing the peak positions versus the 2-theta angle, and FIG. 5 confirms that FAU type zeolites were synthesized.

FIG. 6 shows a Scanning Electron Microscopy image of synthesized Nanozeolite Y as obtained in this example.

TABLE 3

| 2-theta position ± 0.15 (°) | Relative Intensity |
|---|---|
| 6.4 | 100 |
| 10.3 | 30 |
| 12.1 | 24 |
| 15.9 | 39 |
| 18.9 | 17 |
| 20.4 | 28 |
| 23.8 | 62 |
| 27.1 | 58 |
| 29.7 | 23 |
| 30.8 | 37 |
| 31.4 | 67 |

TABLE 3-continued

| 2-theta position ± 0.15 (°) | Relative Intensity |
|---|---|
| 34.1 | 27 |
| 34.6 | 15 |
| 37.9 | 19 |
| 41.3 | 15 |
| 41.9 | 12 |
| 53.8 | 13 |

Example 4

Zeolites were prepared according to example 1, except that the final mole to mole ratios were: 0.15 quinuclidine, 3.33 $SiO_2$, 1.00 $Al_2O_3$, 5.17 $Na_2O$, 205.83 $H_2O$.

Moreover, the aqueous reaction mixture was incubated at 80° C. for 48 h to allow crystallization.

Dynamic light scattering (DLS) measurements were performed on the calcined nanozeolite Y crystals (Na—Y) (FIG. 7a) and on the ion-exchanged nanozeolite Y crystals (H—Y) (FIG. 7b). The mean hydrodynamic diameters for Na—Y is 380 nm and for H—Y is 392 nm.

Example 5

Zeolites were prepared according to example 4, except that the final mole to mole ratios were: 0.21 quinuclidine, 3.33 $SiO_2$, 1.00 $Al_2O_3$, 5.16 $Na_2O$, 200.03 $H_2O$.

Dynamic light scattering (DLS) measurements were performed on the calcined nanozeolite Y crystals (Na—Y) (FIG. 8a) and on the ion-exchanged nanozeolite Y crystals (H—Y) (FIG. 8b). The mean hydrodynamic diameters for Na—Y is 332 nm and for H—Y is 370 nm.

The invention claimed is:

1. A method for synthesizing nanozeolite Y crystals comprising the following steps:
   a) Preparing a first aqueous solution comprising a silicate source and quinuclidine;
   b) Preparing a second aqueous solution comprising an aluminate source and an alkali hydroxide;
   c) Combining the first and the second aqueous solution to obtain an aqueous reaction mixture;
   d) Incubating the aqueous reaction mixture to obtain nanozeolite Y crystals;
   e) Washing the obtained nanozeolite Y crystals with an aqueous washing buffer;
   f) Drying the washed nanozeolite Y crystals to remove residual crystalline water; and
   g) Calcining the washed nanozeolite Y crystals.

2. The method of claim 1, wherein the alkali hydroxide is sodium hydroxide and
   wherein the method comprises the additional steps:
   h) Mixing the calcined nanozeolite Y crystals with a third aqueous solution comprising ammonium ions to exchange the sodium ions of the calcined nanozeolite Y crystals against ammonium ions;
   i) Washing the ammonium containing nanozeolite Y crystals with an aqueous washing buffer;
   j) Drying the washed nanozeolite Y crystals to remove residual crystalline water; and
   k) Calcining the washed nanozeolite Y crystals.

3. The method of claim 2, wherein steps h) to k) are repeated to reduce the amount of $Na^+$ ions in the calcined nanozeolite Y crystals to
   a) less than 5% $Na^+$ ions,
   b) less than 3% $Na^+$ ions, or
   c) less than 1% $Na^+$ ions.

4. The method according to claim 1,
   wherein in the aqueous reaction mixture quinuclidine is contained in a fraction of
   a) between 0.0125 and 0.24 mol %,
   b) between 0.05 and 0.18 mol %, or
   c) between 0.09 and 0.11 mol %.

5. The method according to claim 1,
   wherein in the aqueous reaction mixture the silicate source ($[SiO_4]^{4-}$) is contained in a fraction of
   a) between 0.8 and 4.9 mol %,
   b) between 1.0 and 3.0 mol %, or
   c) between 1.2 and 2.0 mol %.

6. The method according to claim 1,
   wherein in the aqueous reaction mixture the aluminate source ($[Al(OH)_4]^-$) is contained in a fraction of
   a) between 0.48 and 1.06 mol %,
   b) between 0.60 and 1.0 mol %, or
   c) between 0.72 and 0.92 mol %.

7. The method according to claim 1,
   wherein in the aqueous reaction mixture sodium hydroxide is contained in a fraction of
   a) between 1.0 and 8.5 mol %,
   b) between 2.5 and 6.5 mol %, or
   c) between 4.5 and 5.5 mol %.

8. The method according to claim 1,
   wherein the first aqueous solution has a pH value of
   a) between 11 and 14,
   b) between 11.5 and 13.5, or
   c) between 12 and 13.

9. The method according to claim 1,
   wherein the second aqueous solution has a pH value of
   a) between 11 and 14,
   b) between 12.5 and 13.8, or
   c) between 13.2 and 13.6.

10. The method according to claim 1,
    wherein the aqueous reaction mixture has a pH value of
    a) between 11 and 14,
    b) between 11.5 and 13, or
    c) between 12 and 12.5.

11. The method according to claim 1,
    wherein the aqueous washing buffer has a conductivity
    a) smaller than 500 µS/cm,
    b) smaller than 50 µS/cm, or
    c) smaller than 15 µS/cm,
    and wherein the aqueous washing buffer has a pH of
    a) between 5.5 and 8.5,
    b) between 6 and 8, or
    c) between 6.5 and 7.5.

12. The method according to claim 1,
    wherein in the third aqueous solution the ammonium source is contained in a concentration of
    a) between 0.001 and 0.3 M,
    b) between 0.05 and 0.25 M, or
    c) between 0.1 and 0.2 M.

13. The method according to claim 1,
    wherein, after combining the first and the second solution, the aqueous reaction mixture is stirred for a time period of
    a) at least 1 h,
    b) at least 10 h,
    c) at least 25 h, or
    d) at least 40 h.

14. The method according to claim 1,
    wherein, after combining the first and the second solution or stirring the aqueous reaction mixture, the aqueous reaction mixture is incubated at a temperature of a) below 150° C. for a minimum time period of 5 h,
b) between 20° C. and 75° C. for a time period between 60 h and 300 h, or
c) between 75° C. and 100° C. for a time period between 20 h and 60 h.

15. The method according to claim 1,
wherein the washing steps e) and/or i) is/are repeated, until the decanted washing buffer has a pH value of
a) between 5.5 and 8.5,
b) between 6 and 8, or
c) between 6.5 and 7.5.

16. The method according to claim 1,
wherein the nanozeolite Y crystals are calcined at a temperature of
a) below 750° C. for a minimum time period of 2 h,
b) between 650° C. and 750° C. for a time period between 2 and 10 h, or
c) between 550° C. and 650° for a time period between 4 and 15 h.

17. The method according to claim 1,
wherein quinuclidine is used in the aqueous reaction mixture
a) in a fraction of 0.04-0.10 mol % to obtain nanozeolite Y crystals of a diameter between 100-700 nm,
b) in a fraction of 0.12-0.17 mol % to obtain nanozeolite Y crystals of a diameter between 50-300 nm, or
c) in a fraction of 0.10-0.14 mol % to obtain nanozeolite Y crystals of a diameter between 30-200 nm.

* * * * *